United States Patent [19]

Runaldue

[11] Patent Number: 5,787,273
[45] Date of Patent: Jul. 28, 1998

[54] MULTIPLE PARALLEL IDENTICAL FINITE STATE MACHINES WHICH SHARE COMBINATORIAL LOGIC

[75] Inventor: Thomas Jefferson Runaldue, San Jose, Calif.

[73] Assignee: Advanced Micro Devices, Inc., Sunnyvale, Calif.

[21] Appl. No.: 764,212

[22] Filed: Dec. 13, 1996

[51] Int. Cl.[6] .................................................. G06F 1/08
[52] U.S. Cl. .......................... 395/555; 364/488; 364/489
[58] Field of Search ...................... 395/800.28, 800.23, 395/800.32, 800.01, 556, 555, 559; 364/489; 327/291, 293, 294, 295, 296

[56] References Cited

U.S. PATENT DOCUMENTS

| 4,740,891 | 4/1988 | Kirkpatrick | 364/200 |
|---|---|---|---|
| 5,394,557 | 2/1995 | Ellis | 395/555 |
| 5,640,398 | 6/1997 | Carr et al. | 370/376 |
| 5,680,594 | 10/1997 | Charneski et al. | 395/556 |

FOREIGN PATENT DOCUMENTS

| 0 517 241 A2 | 12/1992 | European Pat. Off. . |
|---|---|---|
| 63-076610 A | 4/1988 | Japan . |

OTHER PUBLICATIONS

Schaffner, Mario R., "A Computer Modeled After an Automaton," Computers and Automata, Polytechnic Press of the Polytechnic Institute of Brooklyn, New York, vol. XXI, Apr. 13–15, 1971, pp. 635–650.

*Primary Examiner*—Eric Coleman
*Assistant Examiner*—Mackly Monestime
*Attorney, Agent, or Firm*—Fliesler, Dubb, Meyer & Lovejoy

[57] ABSTRACT

N separate identical finite state machines service N corresponding channels. In one embodiment, each channel operating at a clock frequency F is serviced by the same combinatorial logic block which runs at an N*F clock frequency. The channel inputs are delivered to the shared combinatorial logic block via an N-to-1 multiplexor. N separate output registers continuously provide output to the N separate channels. Each output register is loaded every Nth clock cycle. Although the combinatorial logic is shared amongst multiple machines, the state variables for each machine must be stored in a memory unit. In an embodiment of the memory unit, N separate state variable registers are loaded using the same load enable control signals as are used for the N output registers. The current state for the appropriate channel is selected by means of an N-to-1 multiplexor. An N-element shift register sequentially provides the appropriate channel's state variables to the shared combinatorial logic block. In the preferred embodiment of the memory unit, a dual-ported Random Access Memory (RAM) is used to efficiently aggregate the N channels' state variables. One port is dedicated to writing the next state while another port is dedicated to reading the current state. A read/write pointer is implemented as a counter which sequential counts from 0 to N−1 such that the dual-ported RAM behaves identically to a shift register. In another embodiment, the shared combinatorial logic is pipelined into as many as N separate combinatorial equals the number of channels N.

21 Claims, 7 Drawing Sheets

MULTIPLE PARALLEL IDENTICAL FINITE STATE MACHINES WHICH SHARE COMBINATORIAL LOGIC

BACKGROUND OF THE INVENTION

1. Field of the Invention

The present invention relates to the field of digital systems; and specifically to finite state machines. The present invention relates to integrated circuits which implement multiple finite state machines on the same die.

2. Discussion of the Related Art

Historically, the level of transistor integration has steadily increased. With an increased circuit capacity on individual dies, integrated circuits are being defined with multiple identical functions directed towards independent interfaces. For example, in recent network integrated circuit developments, multiple transceiver channels are being integrated within a single integrated circuit device.

Simultaneously with the increases in the level of transistor integration, circuit performance for the devices which compose the digital circuits has increased. Digital logic systems can be characterized as consisting of storage elements and logic elements. Examples of storage elements are flip/flops and read/write memory cells, while an examples of a logic elements are logic gates and adders. Storage elements are characterized as being able to record digital information for future use and to deliver the recorded information when it is needed. A storage element holding N-bits of information assumes one of $2^n$ specific states when it records a specific N-bit value. Logic elements produce digital outputs by processing and manipulating information either retrieved from storage elements or obtained from other sources. Digital systems are characterized by interconnections of combinatorial logic elements and storage elements. Classical finite state machines are one such manifestation of digital systems which are characterized by registered storage elements connected to areas of combinatorial logic. A registered storage element is an array of storage elements controlled by a common clock. Examples of registered storage elements include a flip-flop and a shift register.

A finite state machine generally accepts digital signal inputs and produces digital signal outputs as a function of the inputs and the current values of the state variables. State variables are the digital information stored in specific storage elements which define the current state of a finite state machine. The next state of a finite state machine is determined as a function of the current state and the inputs. The production of the outputs and the determination of the next state is performed by combinatorial logic. A common practice in digital systems is triggering the overwriting the current state with the next state by a repetitive event. Thus, state variable transitions occur at the rising edge of a clock, for example.

Finite state machines require both storage elements and logic to process the data. FIG. 1 illustrates the classical model of a finite state machine 100. In the finite state machine 100, there are two types of storage elements, internal registers 101 and output registers 102. The internal registers 101 store the current value of the state variables. The output registers 102 latch the output values of the finite state machine 100. Both the internal register 101 and the output register 103 have a clock (CLK) input 103, and therefore are updated once per clock cycle. The finite state machine is therefore a sequential circuit having feedback through the internal register 101. The combinatorial logic block 104 computes the next state 105 and the next output values 106 as a function of the current state and the current inputs. The current output values 109 are output by the output register 102.

Multiple independent identical parallel digital finite state machines can be integrated onto a single device. In conventional implementations of multiple parallel finite state machines, all elements of the finite state machine are replicated so that several complete independent circuits exist on the same die. For integrated applications requiring multiple identical finite state machines, the state machine 100 is replicated several times, as illustrated in FIG. 2. This occurs, for example, when a single chip 200 serves as a transceiver for four independent communication channels. Four finite state machines 201–204 independently serve the four channels. Thus, all hardware components are replicated once for each independent state machine 201–204. The only connection between the independent state machines 201–204 are that they reside on the same integrated circuit die 200. Each finite state machine 201–204 is logically identical to the finite state machine 100 illustrated in FIG. 1; therefore, each finite state machine 201–204 contains its own combinatorial logic 104, internal registers 101, and output registers 102.

Because all of the multiple parallel finite state machines are identical, it would be desirable to avoid any unnecessary functional redundancy and to share as much hardware as is possible.

SUMMARY OF THE INVENTION

Conventional integrated circuits which contain multiple identical parallel finite state machines on the same die entirely replicate the layout of each machine so that each machine has its own dedicated components which are logically and physically separated from the other finite state machines. It is desirable to take advantage of the similarity of the identical finite state machines so as to share as much hardware as is possible amongst the multiple parallel finite state machines. An object of the present invention is to use the same combinatorial logic block to service multiple identical finite state machines. Another object of the present invention is to aggregate the state variable storage for the multiple finite state machines in a centralized memory unit.

According to an embodiment of the present invention, N separate finite state machines service N corresponding channels. Each channel operating at a clock frequency F is serviced by the same combinatorial logic block which runs at an N*F clock frequency. Thus, if four finite state machines each run at 10 MHZ, the combinatorial logic is clocked at 40 MHZ and services each respective channel during every fourth clock cycle. The channel inputs are delivered to the combinatorial logic via an N-to-1 multiplexor. N separate output registers continuously provide output to the N separate channels. Each output register is loaded every Nth clock cycle. The sharing of the internal combinatorial logic according to the present invention is transparent to the devices connected to the integrated circuit, since the circuit according to the present invention implements N independent virtual machines which behave identically to N separate physical finite state machines.

Although the combinatorial logic is shared amongst multiple machines according to the present invention, the state variables for each machine must be stored in a memory unit. In an embodiment of the memory unit, N separate state variable registers are loaded using the same load enable control signals as are used for the N output registers. Similarly to the input multiplexing, the current state for the appropriate channel is selected by means of an N-to-1 multiplexor.

In another embodiment of the memory unit, an N-element shift register sequentially provides the appropriate channel's state variables to the shared combinatorial logic block. This embodiment has the simplest control, although it is not optimal in terms of power consumption, because all the state variables move every clock cycle rather than only every Nth clock cycle.

In the preferred embodiment of the present invention, a dual-ported Random Access Memory (RAM) is used to efficiently aggregate the N channels' state variables. One port is dedicated to writing the next state while another port is dedicated to reading the current state. A read/write pointer is implemented as a counter which sequential count from 0 to N-1 such that the dual-ported RAM behaves identically to a shift register. In this preferred embodiment, the decoded counter value is also available to produce the control signals for the input multiplexor and the output register load enable signals.

According to another embodiment of the present invention, the shared combinatorial logic is pipelined into as many as N separate combinatorial logic sub-blocks. In the pipelined embodiment, the latency from each channel's inputs to its outputs is increased by the number of pipeline flip-flops. The memory device for the state variables is reduced in size such that the total delay around the feedback loop equals the number of channels N. Thus, in a sixteen channel system, with four pipeline flip-flops, for example, the memory device must behave like a twelve-deep shift register.

These and other features and advantages of the present invention will be apparent from the Detailed Description of the Invention as illustrated in the Drawings.

BRIEF DESCRIPTION OF THE DRAWINGS

The Figures of more fully explained in the Detailed Description of the Invention, in which like parts are designated by like numerals.

DETAILED DESCRIPTION OF THE INVENTION

Conventional implementations of multiple identical parallel finite state machines fabricated on the same integrated circuit die replicate all elements of the state machines. Because the state machines are identical, it would be desirable to share as much hardware as possible. The hardware elements in a classical finite state machine are: the state variable registers, the output registers, and the combinatorial logic. Because each state machine has its own state variables and output values, the state variable registers and output registers cannot be shared. However, because the combinatorial logic is the exact same function relating next state and outputs to current state and inputs, the combinatorial logic can be shared provided that the inputs of the combinatorial logic can be connected to the appropriate state variable outputs and state machine inputs while the outputs of the combinatorial logic can be connected to the appropriate state variable inputs and state machine outputs at the appropriate time.

According to the present invention, multiple independent parallel state machines share a common core of digital combinatorial logic. According to another aspect of the present invention, the independent storage elements can be consolidated in a memory array which can be addressed and accessed on a channel by channel basis.

Figure 3:
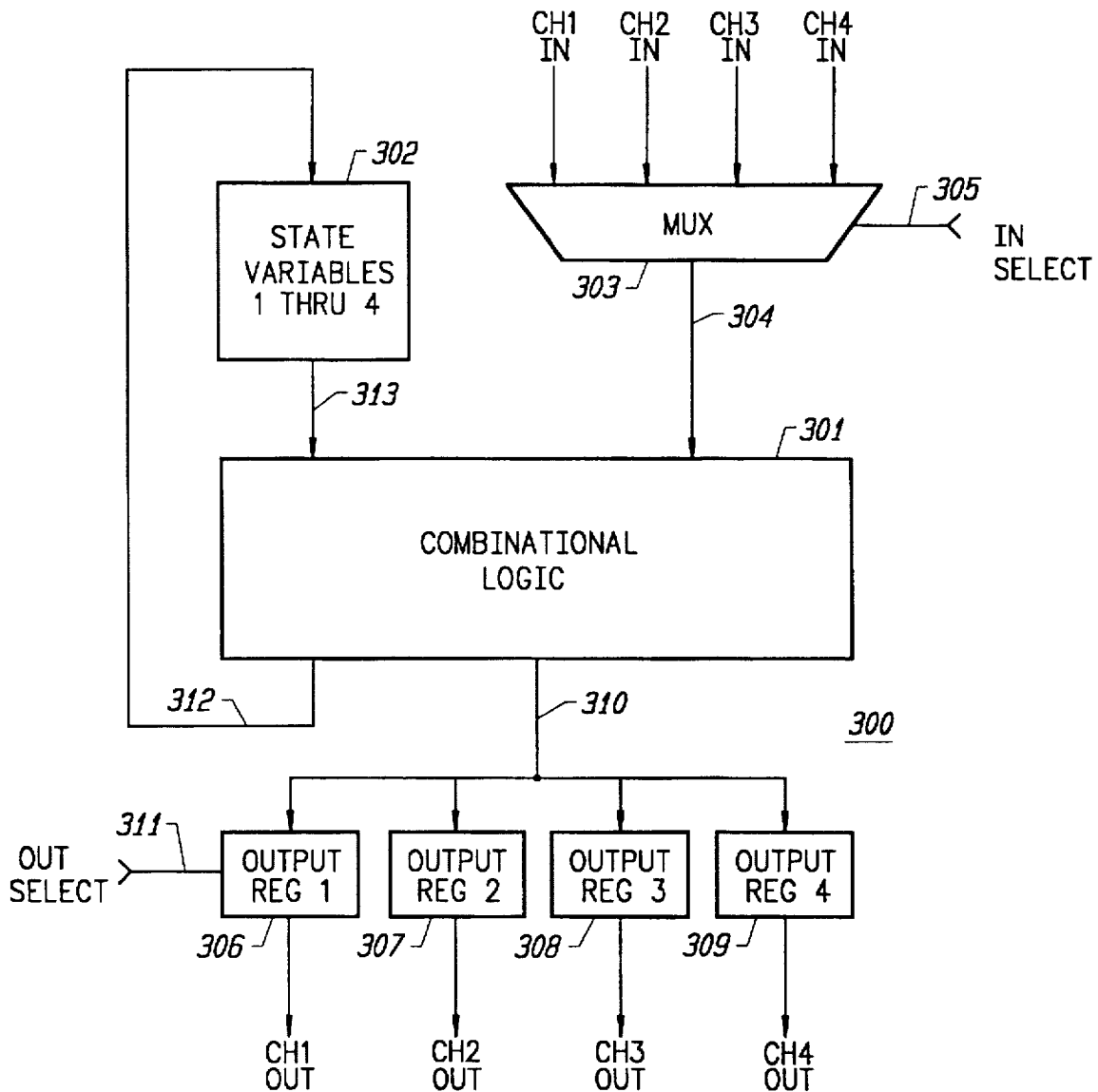
FIG. 3 illustrates an embodiment of the present invention in which four independent parallel identical finite state machines are implemented on the same integrated circuit yet share the same combinatorial logic block.

FIG. 3 illustrates an embodiment of the present invention. According to the present invention, a single combinatorial unit 301 is shared amongst multiple channels. Channels one through four each have independent inputs (CH1IN-CH4IN) and outputs (CH1OUT-CH4OUT) The integrated circuit chip 300 according to the present invention implements four independent virtual state machines which behave identically to four independent physical state machines. The internal state variables for the four independent state machines are collected and centralized in a single memory unit 302. The channel input signals (CH1IN-CH4IN) are funneled through a multiplexor 303. An input select signal IN SELECT 305 specifies which channel input signal (CH1IN-CH4IN) passes through the multiplexor 303 to the multiplexor output 304 and into the combinatorial logic 301 inputs. The current state for the appropriate channel 313 is output from the memory unit 302. Each of the output registers 306-309 corresponds to a separate channel. When the combinatorial logic 301 computes the next output values 310 for a specific channel, the corresponding one of the four output registers 306-309 is loaded as specified by the output select signal OUT SELECT 311. When the next state variables 312 are computed by the combinatorial logic 301, they are stored in the memory unit 302, whose control will be described below in conjunction with its preferred and alternative embodiments.

According to an aspect of the present invention, separate registered state variables are required for each channel. The preferred embodiment and three alternative embodiments for this aspect will be described below.

Figure 4:
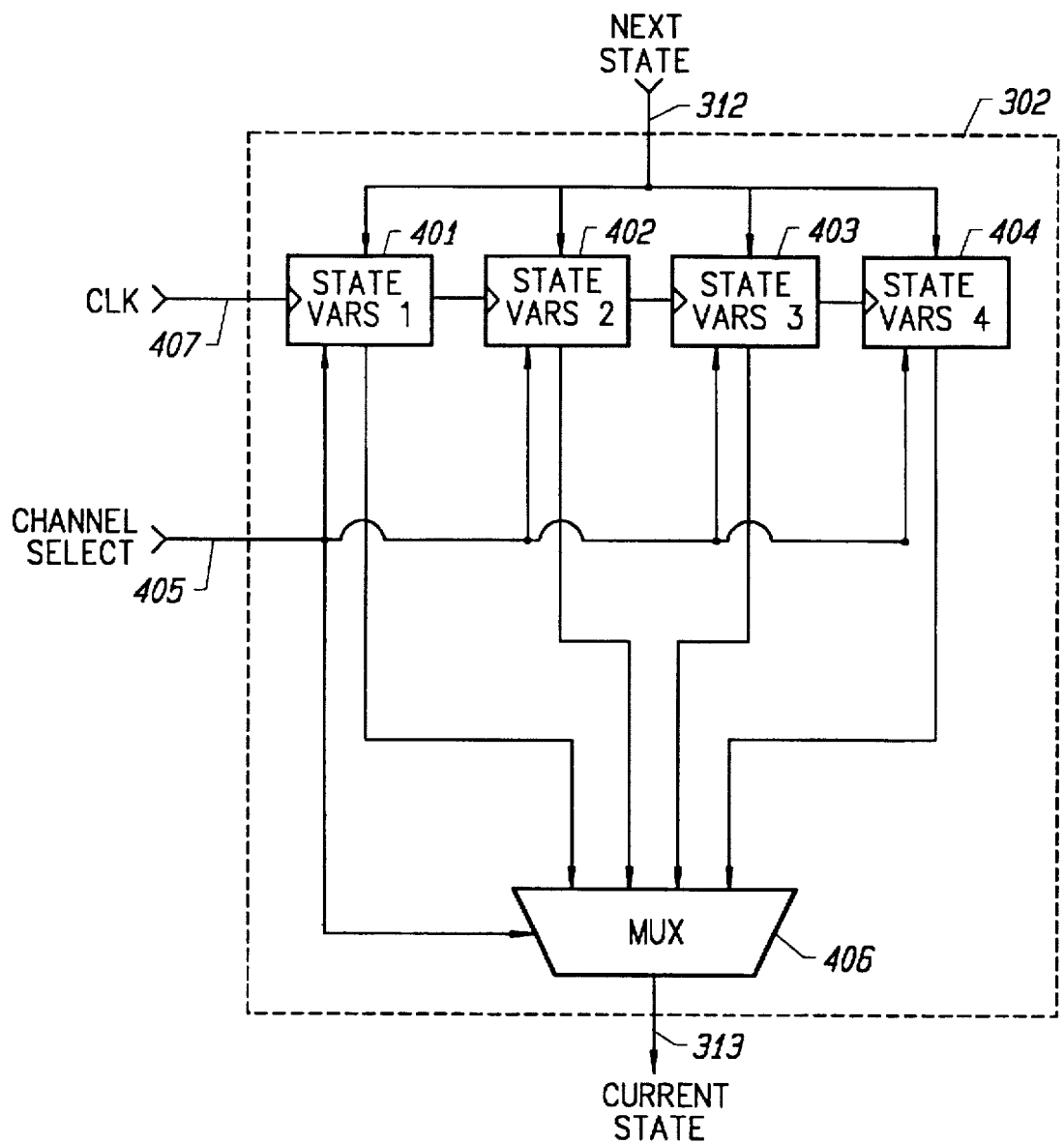
FIG. 4 illustrates an embodiment of the state variable registers which is suitable for use in the four-state-machine implementation of the present invention illustrated in FIG. 3.

FIG. 4 illustrates one embodiment of the memory unit 302. In this embodiment, the memory unit 302 is implemented as four separate state variable registers 401-404. A channel select signal CHANNEL SELECT 405 directs a multiplexor 406 to output the current state from the appropriate state variable register 401-404. The next state 312 is loaded into the selected register at the rising clock CLK 407 edge, for example. The channel select signal 405 enables loading for the selected channel.

Figure 5:
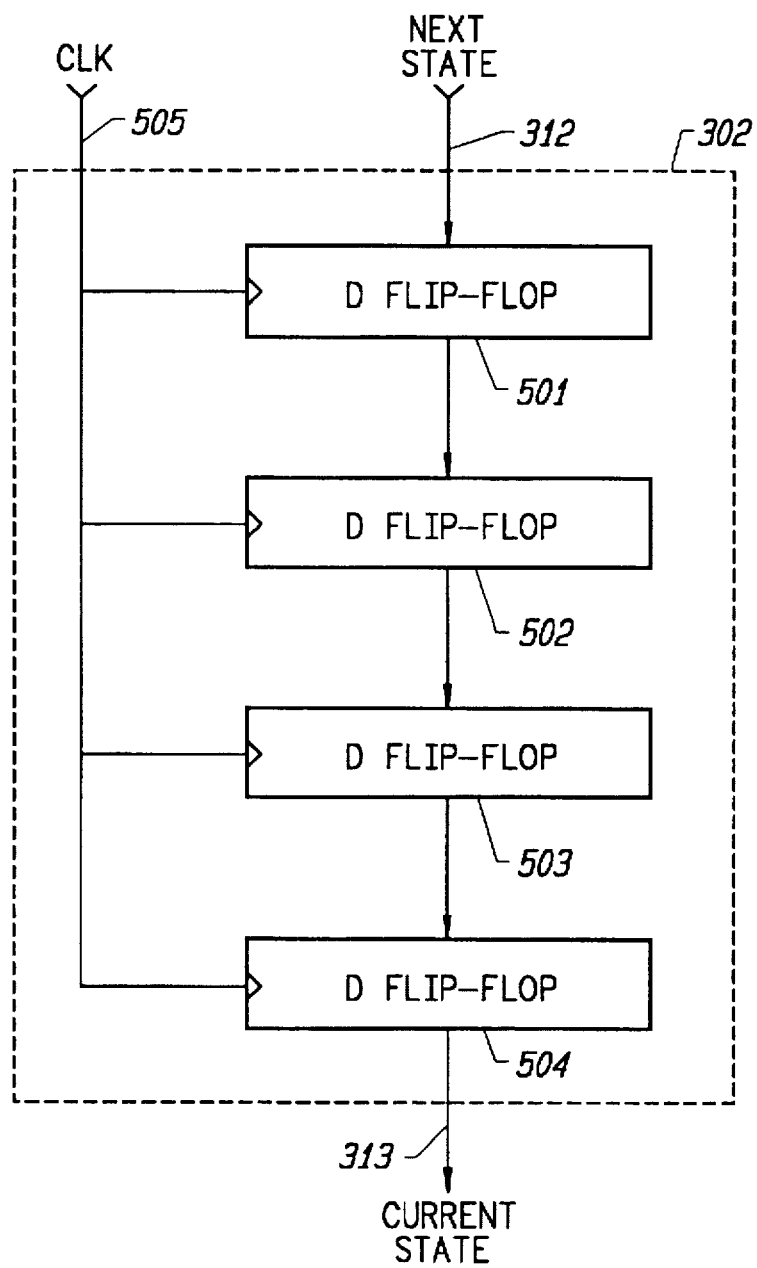
FIG. 5 illustrates another embodiment of the state variable registers which is suitable for use in the four-state-machine implementation of the present invention illustrated in FIG. 3.

FIG. 5 illustrates another embodiment of the memory unit 302. In this alternative embodiment, the memory unit 302 is implemented as a four-element shift register consisting of D-type flip-flops 501–504 which shift state variable information forward each clock CLK 505 cycle. During one clock cycle, flip-flop 504 would hold state variable information for channel 1 while channel 2 state variable information is in flip-flop 503, channel 3 state variable information is in flip-flop 502, and channel 4 state variable information is in flip-flop 501. After the rising edge of the clock, flip-flop 504 would hold state variable information for channel 2, while channel 3 state variable information is in flip-flop 504, channel 4 state variable information is in flip-flop 502, and channel 1 state variable information is in flip-flop 501. The state variable information circulates around the shift register with each channel's state variable information occupying one of the flip-flops 501-504 at all times.

Figure 6:
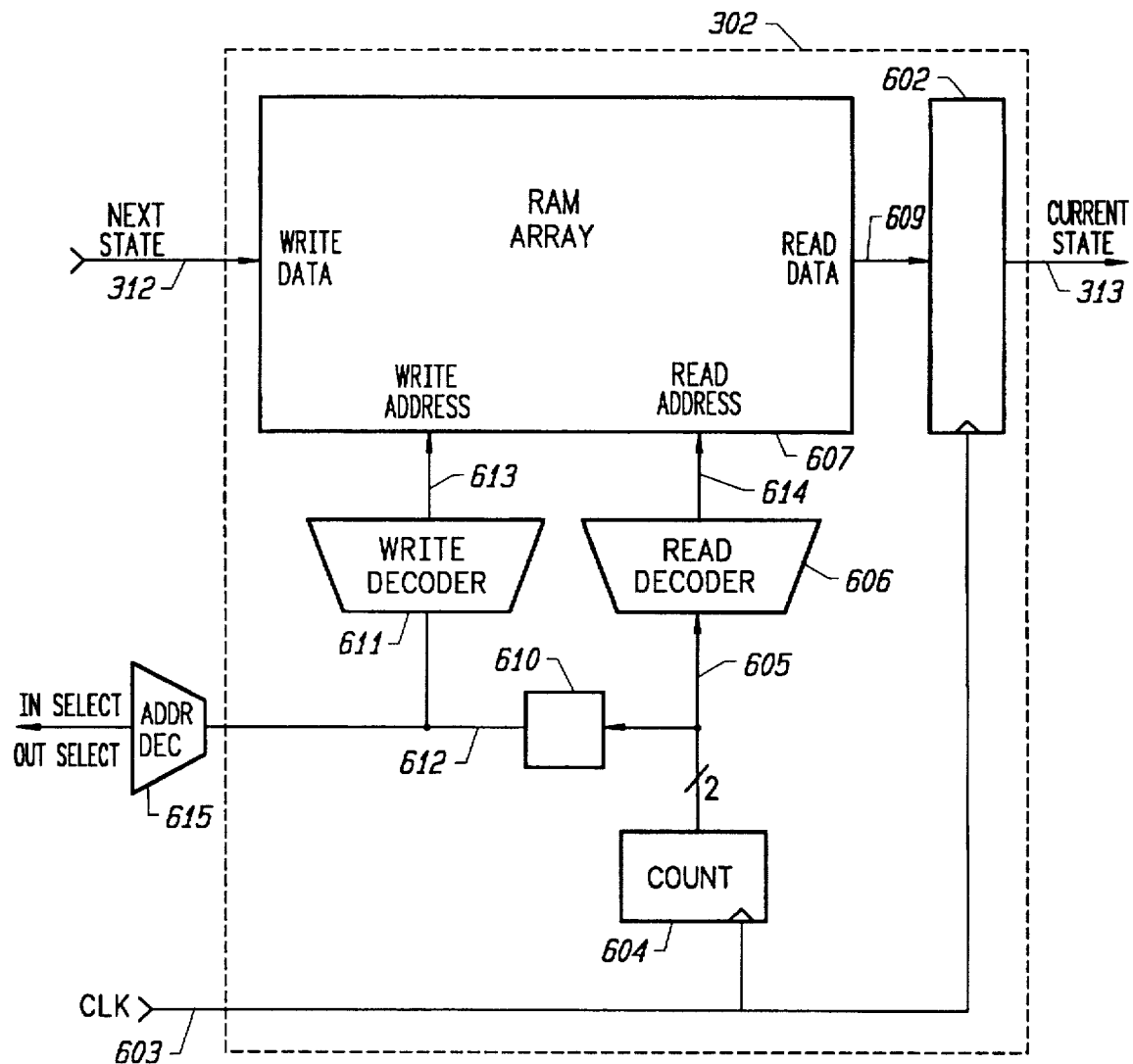
FIG. 6 illustrates the preferred embodiment of the state variable registers which is suitable for use in the four-state-machine implementation of the present invention illustrated in FIG. 3.

FIG. 6 illustrates the preferred embodiment of the memory unit 302 according to the present invention. The next state 312 is input into a random access memory (RAM) array 607 write port. The clock CLK 603 drives a two-bit counter 604. The encoded two-bit output 605 of the counter 604 is decoded by the read address decoder 606 which produces the read word lines for the RAM array 607. The next state input 312 drives the write amplifiers (not shown) connected to the write port bit lines (not shown) of the RAM array 607. The read port bit lines of the RAM array 607 are interpreted by the sense amplifiers (not shown) which drive inputs 609 of the output flip-flop 602. The output flip-flop 602 changes its state at the rising edge of the clock 603. Because the data 609 read from the RAM array 607 is delayed by one clock cycle by the flip-flop 602, the read port reads one location ahead of the writing through the write port 312. A flip flop 610 delays the counter output 605 so that the decoded write address 613 is one location behind the decoded read address 614. Thus, during any given clock cycle, reading and writing are not being performed on the same memory location.

Referring back to FIG. 3, the output select signal 311 is preferably an decoded set of load enable signals for the output registers 306-309. The control inputs 305 to the input multiplexor 303 are either encoded or decoded. If they are decoded, then they are logically equivalent to the output select signal 311. In this case, referring back to FIG. 6, a decoder 615 produces the decoded control signals IN SELECT 305 and OUT SELECT 311 from the encoded counter output 612 output from the delay element 610. The decoder 615 is logically equivalent to the write address decoder 606 dedicated to the RAM array 607. Because the read access time from a RAM is typically greater than the write time, the flip-flop 602 is placed at the output. However, there is no requirement according to the present invention that flip-flop 602 be on the output. For example, the flip-flop 602 could alternatively buffer the input 312 of the write port of the RAM 607.

Figure 1:
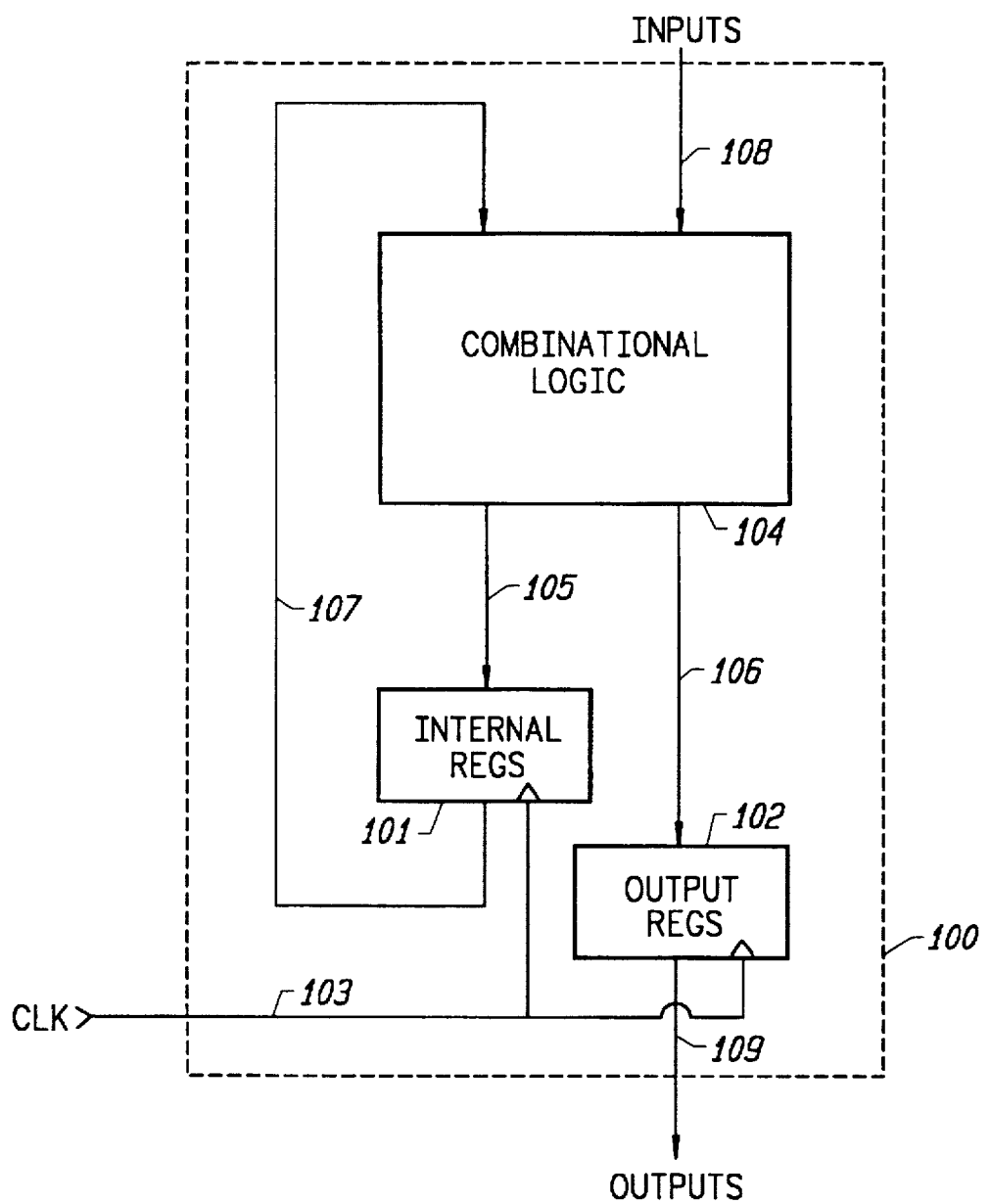
FIG. 1 illustrates a single conventional classic finite state machine.
Figure 2:
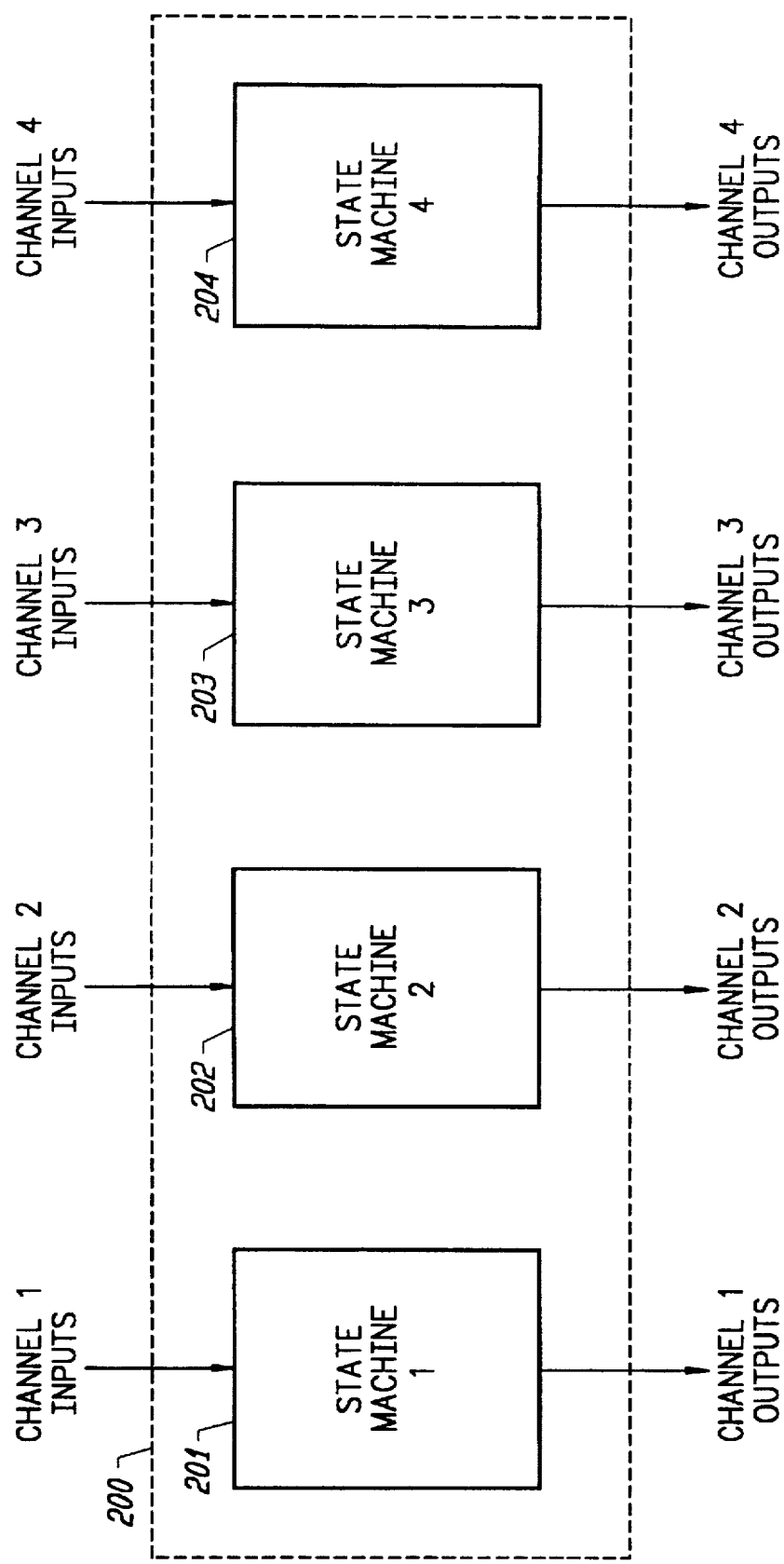
FIG. 2 illustrates a conventional implementation of four independent parallel identical finite state machines on the same integrated circuit in which all elements of each finite state machine are completely replicated four times..
Figure 7:
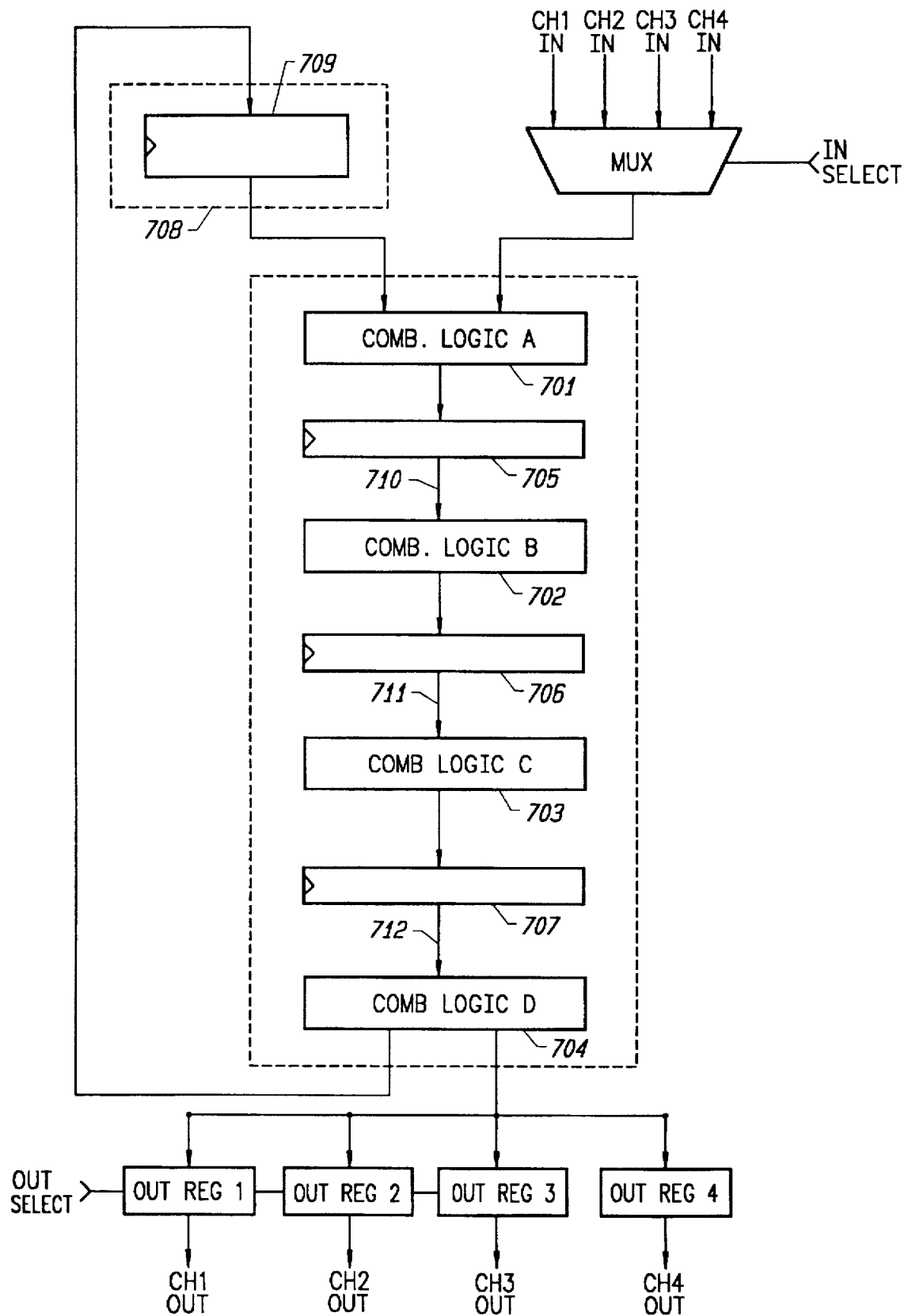
FIG. 7 illustrates an alternative embodiment of the present invention in the shared combinatorial logic is pipelined so that the input to output latency of each channel is greater than one clock cycle.

FIG. 7 illustrates a pipelined embodiment of the present invention. According to the embodiment illustrated in FIG. 1, the combinatorial logic is separated into four separate logic networks 701-704. Three intermediate flip-flops 705-707 are used to separate four combinatorial logic modules 701-704. The state variable register 708 includes only one flip-flop 709 in this instance, because the total delay around the feedback loop must equal the number of channels. Because there are three flip-flops 705-707 in the combinatorial logic path and only four channels, only one flip-flop 709 is needed to store the state variables.

In this pipelined embodiment of the present invention, the latency from inputs CH1IN-CH4IN to outputs CH1OUT-CH4OUT is four clock cycles rather than only one. Because each combinatorial logic module 701-704 operates on a different channel, the OUT SELECT control signal is no longer logically equivalent to the IN SELECT control signal, but rather is delayed by the number of intermediate flip-flops P. There is no requirement that the number of bits within each intermediate signal 710-712 is equal.

In this pipelined embodiment, the RAM (FIG. 6) or shift register (FIG. 5) embodiments of the memory unit are greatly preferred over the separate register/multiplexor embodiment (FIG. 4). This preference is based upon the fact that if the separate register/multiplexor embodiment is used, all sixteen (N) registers must be physically implemented rather than only twelve (N—# of pipeline stages P). The separate register/multiplexor embodiment involves simpler control in that the same control signal controls the input multiplexor and the state variable multiplexor, however it includes additional unnecessary registers. In the pipelined embodiment, there are fewer state variable registers than channels, therefore the address of the RAM in the embodiment of FIG. 6 and the addressing of the input multiplexor 303 are different. Specifically, if the number of pipeline flip-flops is P while the number of channels is N, the counter 604 addressing the RAM array repetitively counts from 0 to N-P-1. In contrast, a separate input/output counter exists for the addressing of the input multiplexor and the output load enables. The input/output counter counts from 0 to N-1. The load enable signals are delayed by P clock cycles from the input multiplexor select signals.

Although it is possible to use only N minus P RAM memory locations, for the sake of debugging simplicity, it is sometimes preferable to implement all N locations within the memory array 607 so that the same memory location will always correspond to the same channel. In this case, the amount of delay introduced by the delay element 610 in FIG. 6 is greater than one clock cycle; delay element 610 delays the counter 604 output 605 by P+1 clock cycles. In this case, instead of using flip-flops 610, it may be more economical to use a subtractor 610 to subtract P+1 from the counter 604 output 605.

According to the present invention, the number of pipeline stages can vary from zero (FIG. 3) to one less than the number of channels (FIG. 7). The number of storage locations required in the preferred embodiments of the memvariable storing the state variables equals the number of channels minus the number of pipeline stages. The flip-flops 705-707 can alternatively be implemented as latches operating off alternate phases of the clock. Such that one half clock cycle delay is incurred at each latch. It is to be understood that various alternative pipelining, memory addressing, and latching strategies can be employed to implement and control the shared combinational logic according to the present invention. For the sake of brevity, only the best modes of this state variable storage are described. Those skilled in the art will be enabled by this disclosure to construct various state variable first-in-first-out buffers using these and a variety of other designs.

Products developed using the present invention include four 10/100 Megabit Ethernet transceiver channels integrated within a single integrated circuit device. Future products include the integration of twenty-four identical Media Access Control functions within a single integrated circuit.

While the present invention has been described in conjunction with its preferred and alternative embodiments, these embodiments are offered by way of illustration rather than by way of limitation. Those skilled in the art will be enabled by this disclosure to make various modifications and alterations to the embodiments described without departing from the spirit and scope of the present invention. Accordingly, these modifications and alterations are deemed to lie within the spirit and scope of the present invention as specified by the appended claims.

What is claimed is:

1. An integrated circuit device for servicing N channels, comprising:
   a combinatorial logic block having a current state input, a channel input, a next state output, and a channel output;
   an input multiplexor having N inputs and an output, wherein each of the N inputs is coupled to a corresponding one of the N channels, and wherein the output is coupled to the combinatorial logic block channel input;
   a memory unit having a next state input and a current state output, and having N state variable storage locations corresponding to the N channels, wherein the next state input is coupled to the combinatorial logic block next state output, and wherein the current state output is coupled to the combinatorial logic block current state input; and
   N output registers, each register having an input and an output, wherein each of the inputs is coupled to the combinatorial logic block channel output, and wherein each of the outputs is coupled to a corresponding one of the N channels.

2. An integrated circuit device as in claim 1,
   wherein the memory unit comprises:
   N state variable registers each having an input and an output, wherein the input is coupled to the next state input; and
   a state variable multiplexor having N inputs and an output, wherein each of the N inputs is coupled to a corresponding one of the N state variable register outputs, wherein the output is coupled to the current state output.

3. An integrated circuit device as in claim 1,
   wherein the memory unit comprises:
   an N-element shift register having an input coupled to the next state input and having an output coupled to the current state output.

4. An integrated circuit device as in claim 1,
   wherein the memory unit comprises:
   a random access memory having N locations, each location corresponding to one of the N channels.

5. An integrated circuit device as in claim 4, further comprising:
   a counter having a channel select output coupled to an address input of the random access memory.

6. An integrated circuit device as in claim 4,
   wherein the random access memory has a read port and a write port, the read port being coupled to the current state output and the write port being coupled to the next state input.

7. An integrated circuit device as in claim 5,
   wherein the counter channel select output is coupled to a control input of the input multiplexor and is coupled to load enable inputs of the N output registers.

8. An integrated circuit device for servicing N channels, comprising:
   a pipelined combinatorial logic block having a current state input, a channel input, a next state output, and a channel output, wherein the pipelined combinatorial logic block has P intermediate pipeline register elements, such that P is less than N;
   an input multiplexor having N inputs and an output, wherein each of the N inputs is coupled to a corresponding one of the N channels, and wherein the output is coupled to the combinatorial logic block channel input;
   a memory unit having a next state input and a current state output, and having N minus P state variable storage locations corresponding to the N channels, wherein the next state input is coupled to the combinatorial logic block next state output, and wherein the current state output is coupled to the combinatorial logic block current state input; and
   N output registers, each register having an input and an output, wherein each of the inputs is coupled to the combinatorial logic block channel output, and wherein each of the outputs is coupled to a corresponding one of the N channels.

9. An integrated circuit device as in claim 8,
   wherein the memory unit comprises:
   an N minus P element shift register having an input coupled to the next state input and having an output coupled to the current state output.

10. An integrated circuit device as in claim 8,
    wherein the memory unit comprises:
    a random access memory.

11. An integrated circuit device as in claim 10, further comprising:
    a channel counter having a channel select output coupled to a select input of the input multiplexor.

12. An integrated circuit device as in claim 11, wherein a load enable signal coupled to the N output registers is the channel select output delayed by P clock cycles.

13. An integrated circuit device as in claim 11, wherein the random access memory has N minus P locations, further comprising:
    a RAM address counter having a RAM address output coupled to the random access memory, wherein the RAM address counter sequentially assumes N minus P states, each state corresponding to a unique one of the N minus P locations.

14. An integrated circuit device as in claim 10,
    wherein the random access memory has a read port and a write port, the read port being coupled to the current state output and the write port being coupled to the next state input.

15. An integrated circuit device for servicing N channels, comprising:
    a combinatorial logic block having a current state input, a next state output, and a channel output;
    a memory unit having a next state input and a current state output, and having N state variable storage locations corresponding to the N channels, wherein the next state input is coupled to the combinatorial logic block next state output, and wherein the current state output is coupled to the combinatorial logic block current state input; and
    N output registers, each register having an input and an output, wherein each of the inputs is coupled to the combinatorial logic block channel output, and wherein each of the outputs is coupled to a corresponding one of the N channels.

16. An integrated circuit device as in claim 15,
    wherein the memory unit comprises:
    N state variable registers each having an input and an output, wherein the input is coupled to the next state input; and a state variable multiplexor having N inputs and an output, wherein each of the N inputs is coupled to a corresponding one of the N state variable register outputs, wherein the output is coupled to the current state output.

17. An integrated circuit device as in claim 15, wherein the memory unit comprises:

an N-element shift register having an input coupled to the next state input and having an output coupled to the current state output.

18. An integrated circuit device as in claim 15, wherein the memory unit comprises:

a random access memory having N locations, each location corresponding to one of the N channels.

19. An integrated circuit device as in claim 18, further comprising:

a counter having a channel select output coupled to an address input of the random access memory.

20. An integrated circuit device as in claim 18, wherein the random access memory has a read port and a write port, the read port being coupled to the current state output and the write port being coupled to the next state input.

21. An integrated circuit device as in claim 19, wherein the counter channel select output is coupled to load enable inputs of the N output registers.

* * * * *